United States Patent
Su et al.

(10) Patent No.: US 8,870,589 B2
(45) Date of Patent: Oct. 28, 2014

(54) CABLE CONNECTOR

(75) Inventors: Ping-Sheng Su, New Taipei (TW); Jun Chen, Kunshan (CN); Qing Wang, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 239 days.

(21) Appl. No.: 13/477,356

(22) Filed: May 22, 2012

(65) Prior Publication Data

US 2012/0302103 A1 Nov. 29, 2012

(30) Foreign Application Priority Data

May 23, 2011 (CN) .......................... 2011 2 0165557

(51) Int. Cl.
*H01R 4/24* (2006.01)
*G02B 6/38* (2006.01)
*H01R 24/64* (2011.01)
*H01R 13/506* (2006.01)

(52) U.S. Cl.
CPC ............ *H01R 4/2404* (2013.01); *G02B 6/3817* (2013.01); *H01R 13/506* (2013.01); *H01R 24/64* (2013.01); *G02B 6/387* (2013.01); *G02B 6/3853* (2013.01)
USPC .......................................... 439/404; 439/418

(58) Field of Classification Search
USPC .................................................. 439/404, 418
See application file for complete search history.

(56) References Cited

U.S. PATENT DOCUMENTS

| | | | | |
|---|---|---|---|---|
| 4,902,242 | A | * | 2/1990 | Davis et al. .................... 439/404 |
| 5,419,718 | A | * | 5/1995 | Milburn et al. ................ 439/578 |
| 5,971,812 | A | | 10/1999 | Martin |
| 6,409,544 | B1 | * | 6/2002 | Wu ........................... 439/607.05 |
| 7,425,159 | B2 | * | 9/2008 | Lin ................................ 439/676 |
| 7,503,797 | B2 | * | 3/2009 | Lappoehn ..................... 439/404 |
| 8,167,662 | B2 | * | 5/2012 | Milette et al. ................. 439/676 |

* cited by examiner

*Primary Examiner* — Truc Nguyen
(74) *Attorney, Agent, or Firm* — Ming Chieh Chang; Wei Te Chung

(57) ABSTRACT

A cable connector (100) includes an insulative housing (1), a plurality of contacts (2) retained in the insulative housing (1) and a cable (3) connecting to the contacts (2). The insulative housing (1) includes a first body (11) and a positioning block (13). The first body (11) has a number of inserting slots (1331) passing downwardly therethrough. The positioning block (13) has a plurality of receiving passageways (1301) passing therethrough along a front-to-back direction to retain to the cable (3) therein. The contacts (2) each has a sharp top end (21). The positioning block (13) is retained in the first body (11) downwardly. The sharp top ends (21) of the contacts (2) pierce the cable (3) to connect with the cable (3) reliably.

19 Claims, 6 Drawing Sheets

CABLE CONNECTOR

BACKGROUND OF THE INVENTION

1. Field of the Invention

The present invention generally relates to a cable connector and more particularly to a cable connector.

2. Description of Related Art

U.S. Pat. No. 5,971,812 discloses a cable connector including an insulative housing, a plurality of contacts retained in the insulative housing and a cable connecting with the contacts. The insulative housing comprises a first body and a positioning block. The first body comprises a top wall, a bottom wall, two sides walls and a mounting space formed by the top, bottom and sides walls. The first body comprises a receiving slot passing through the bottom wall. The position block has a number of retaining grooves passing therethrough and the cable is retained in the retaining grooves. The positioning block is assembled to the first body along a front-to-rear direction. The contacts each has a sharp top end and the sharp top ends of the contacts pierce the cable to connect with the cable. However, when the position block inserts into the first body along a front-to-rear direction, the cable may not be assembled to the right location and that may further causes the contact to pierce the cable inaccurately.

Other objects, advantages and novel features of the present invention will become more apparent from the following detailed description of the present embodiment when taken in conjunction with the accompanying drawings.

SUMMARY OF THE INVENTION

The present invention provides a cable connector comprises an insulative housing having a first body and a positioning block, a plurality of contacts retained in the insulative housing and a cable connecting to the contacts. The first body has a number of inserting slots passing downwardly therethrough. The positioning block has a plurality of receiving passageways passing therethrough along a front-to-back direction to retain to the cable therein. The contacts each has a sharp top end. The positioning block is retained in the first body downwardly. The sharp top ends of the contacts pierce the cable to connect with the cable reliably.

Other objects, advantages and novel features of the present invention will become more apparent from the following detailed description of the present embodiment when taken in conjunction with the accompanying drawings.

DETAILED DESCRIPTION OF THE INVENTION

Figure 1:
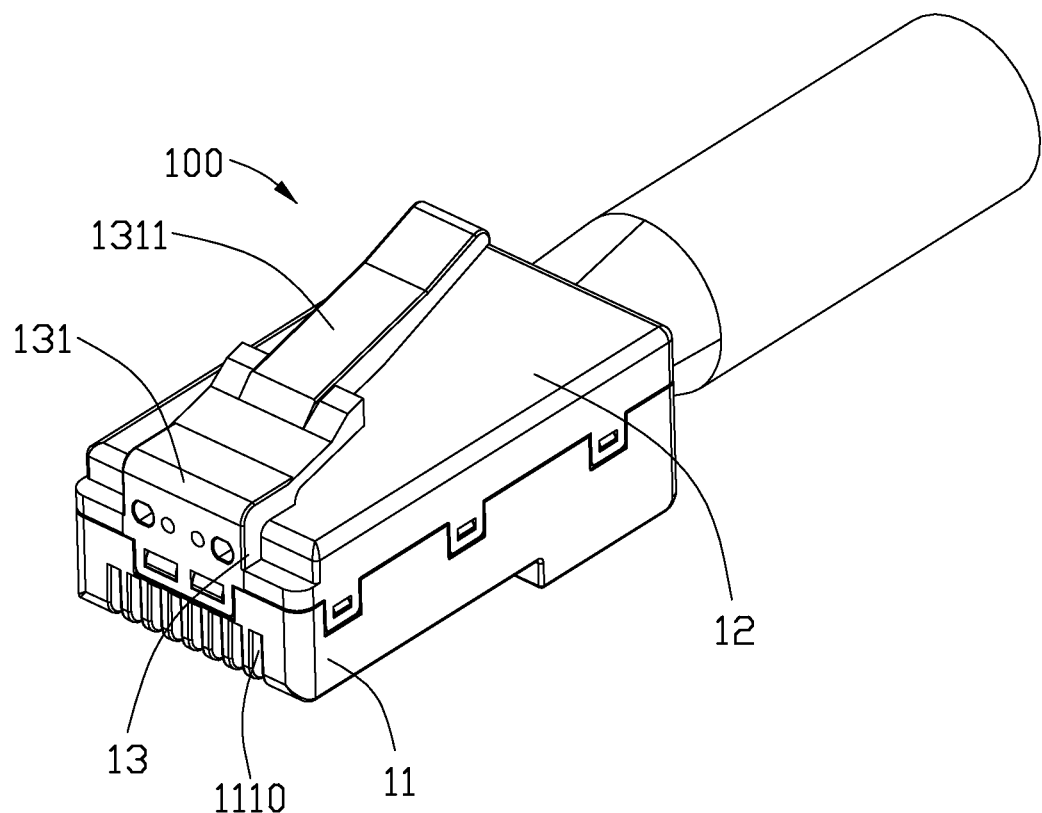
FIG. 1 is an assembled perspective view of a cable connector according to a preferred embodiment of the present invention.
Figure 2:
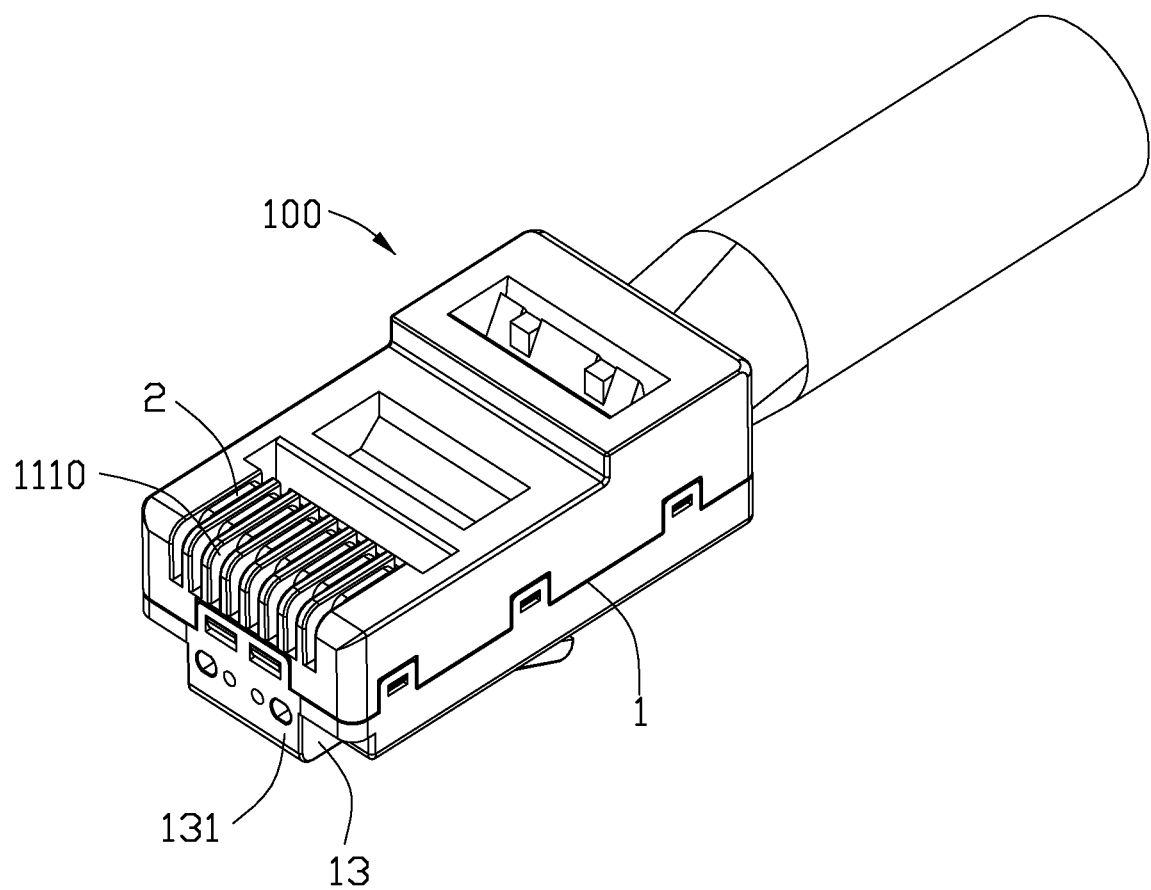
FIG. 2 is another perspective view of the cable connector as shown in FIG. 1.
Figure 3:
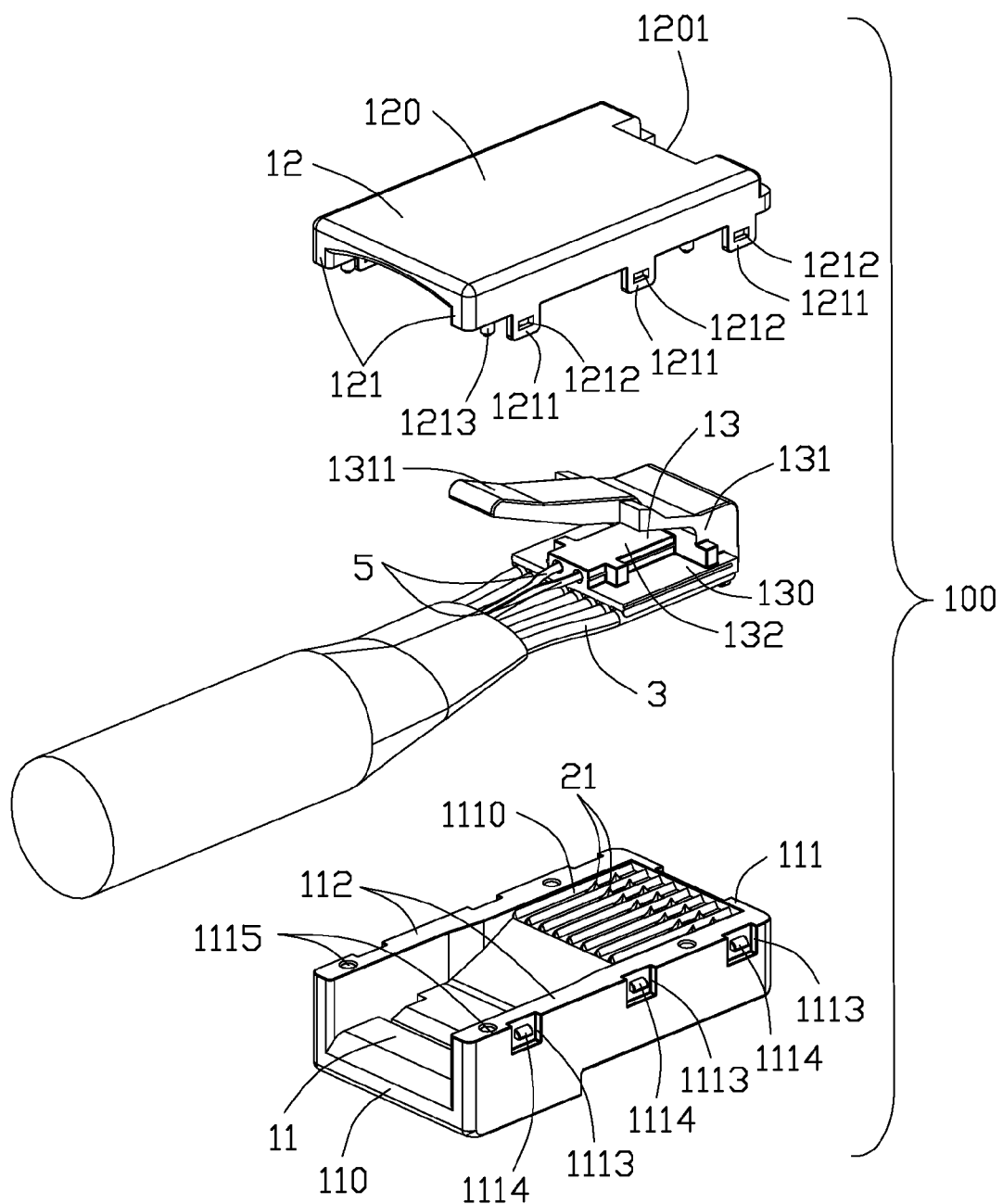
FIG. 3 is a partially exploded view of the cable connector as shown in FIG. 1.

Reference will now be made to the drawing figures to describe the preferred embodiment of the present invention in detail.

Referring to FIGS. 1-4, a cable connector 100 in this present invention is used to connect with a mating connector. The cable connector 100 includes a insulative housing 1, a plurality of contacts 2 retained in the insulative housing 1, a cable 3 connecting with the contacts 2, an optic lens (not labeled) assembled in the insulative housing 1 and an optic fiber 5 received in the insulative housing 1 and adapter for coupling with the optic lens.

Referring to FIGS. 1-4, the insulative housing 1 includes a first body 11, a second body 12 and a positioning block 13. The first body 11 includes a bottom wall 110, a front wall 111 extending upwardly from a front of the bottom wall 110 and two extending walls 112 extending upwardly from two sides of the bottom wall 110. The first body 11 includes a plurality of inserting slots 1110 passing through the front wall 111 and the front of the bottom wall 110. The insulative housing 1 includes a retaining groove 1111 depressed backwardly from the front wall 111, a flange 1112 extending forwardly from the retaining groove 1111, a plurality of depressions 1113 passing upwardly through the extending walls 112 and a locking protrusion 1114 extending outside from the depressions 1113. A top of the extending wall 112 includes a plurality of receiving holes 1115.

Referring to FIGS. 3-6, the second body 12 includes a top wall 120, two side walls 121 extending downwardly from two sides of the top wall 120, a plurality of locking members 1211 extending downwardly from the side walls 121, a plurality of through holes 1212 each passing through the locking member 1211 along a left-to-right direction. The second body 12 includes a mounting space 1201 passing through a front of the top wall 120 and a first mounting slot 1202 extending from two sides of the mounting space 1201 and communicating with the mounting space 1201. The top wall 120 includes a lump 1203 which is located in the back of the first mounting slot 1202, a passageway slot 1204 depressing in a middle of the lump 1203, and a mounting groove 1205 located in the front of the lump 1203. The mounting groove 1205 is communicated with the passageway slot 1204. The mounting groove 1205 includes two second mounting slots 1206 depressing from two sides of the mounting groove 1205. The side wall 121 includes a plurality of posts 1213 extending downwardly from the side walls 121.

Figure 4:
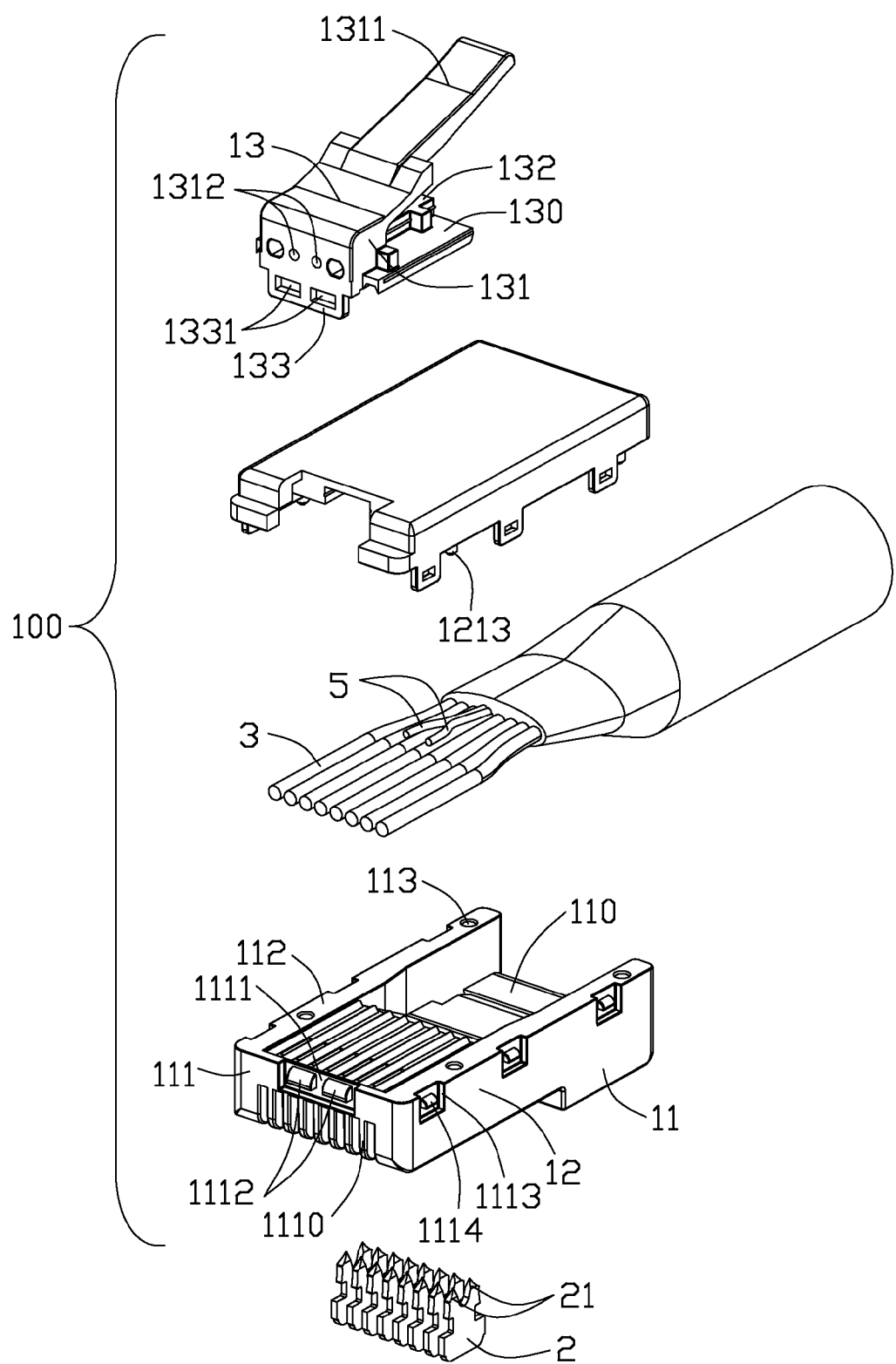
FIG. 4 is an exploded view of the cable connector as shown in FIG. 1.
Figure 5:
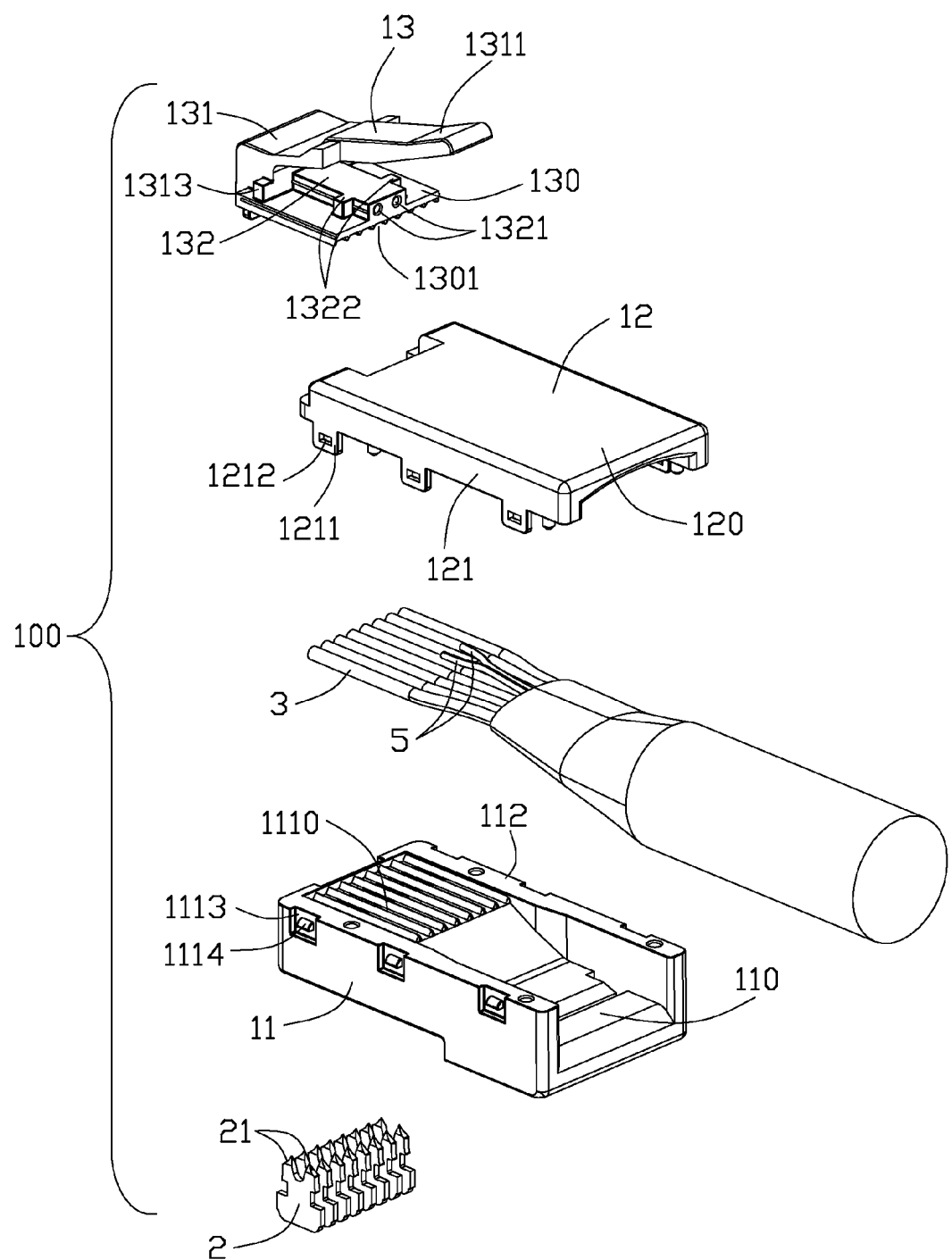
FIG. 5 is another exploded view of the cable connector similar with FIG. 4.

Referring to FIGS. 4-5, the positioning block 13 includes a horizontal portion 130, a convex 131 extending upwardly from a front of the horizontal portion 130, a tab 132 extending backwardly from the convex 131, a locking portion 1311 extending backwardly and aslant from the convex 131 and an extending portion 133 extending downwardly from a front of the horizontal portion 130. The locking portion 1311 is located beyond the tab 132. The positioning block 13 includes two receiving grooves 1312 passing through the convex 131 along a front-to-back direction and two mounting holes 1321 passing through the tab 132 along a front-to-back direction. The mounting hole 1321 is communicated with the receiving groove 1312. The convex 131 includes two first retaining lump 1313 extending therefrom. The tab 132 includes two second retaining lump 1322 extending therefrom.

Figure 6:
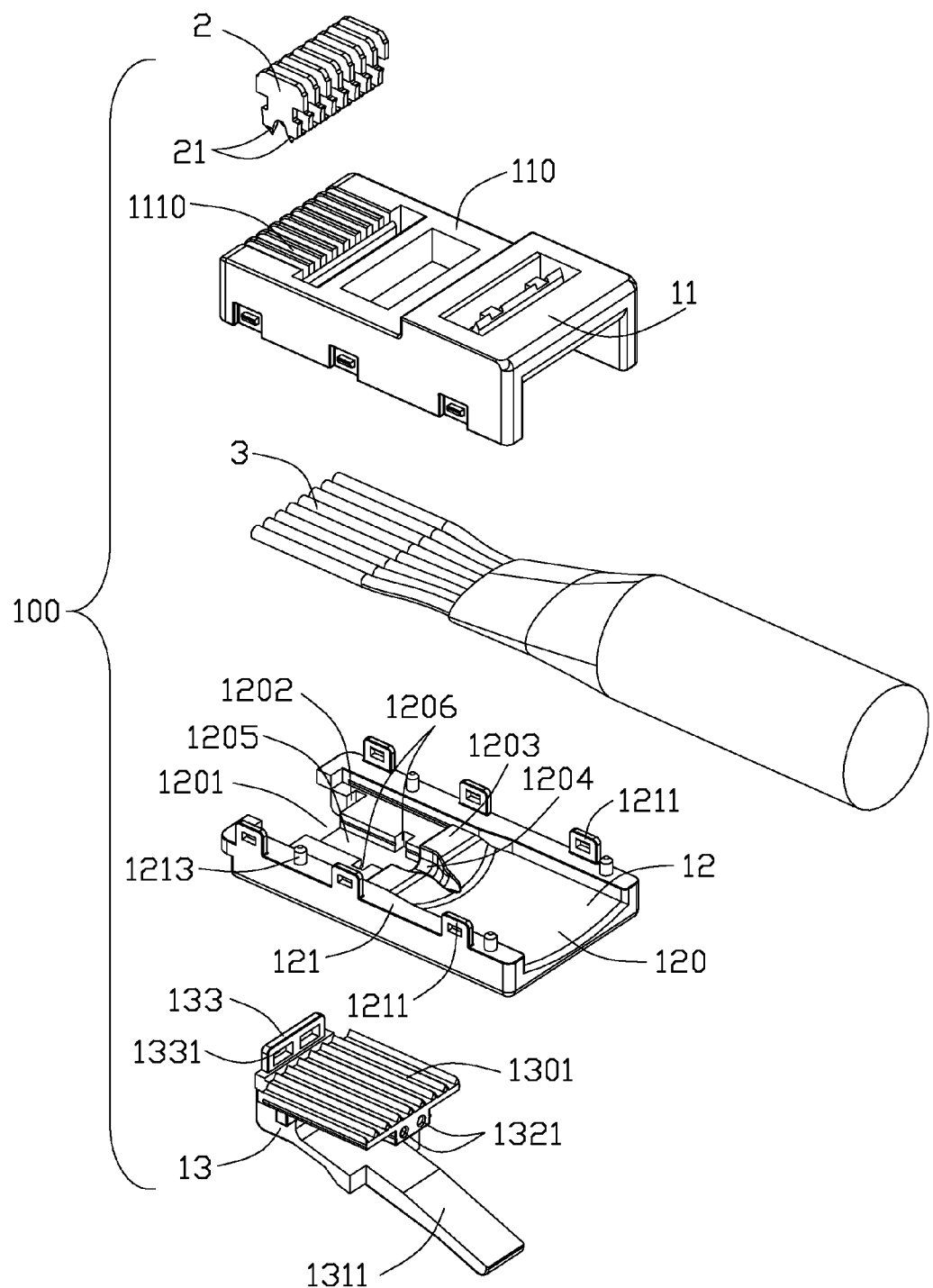
FIG. 6 is a further exploded view of the cable connector taken from a bottom side.

Referring to FIGS. 4-6, the optical lens is assembled in the receiving groove 1312 and exposed outside forwardly. The optic lenses are corresponded with the receiving grooves 1312. The cable 3 is received in the receiving passageway 1301. The optic fiber 5 is inserted into the receiving groove 1312 of the convex 131 forwardly from the mounting hole 1321 of the tab 132. The optic fiber 5 is coupled with the optic lenses for transmitting the optical signal. Then, the positioning block 13 together with the second body 12 are assembled downwardly in the first body 11. The cable 3 is retained between the receiving passageway 1301 and the inserting slot 1110, the extending portion 133 of positioning block 13 is retained in the retaining groove 1111, and the flange 1112 is latched with the retaining slots 1331. The contacts 2 inserted into the inserting slot 1110 and abut against the cable 3. The contacts 2 each includes a sharp top end 21 to pierce the insulative skin of the cable 3 to electrically conduct with the cable. The contacts 2 are received in the inserting slot 1110. The second body 12 is assembled downwardly to the first body 11, the locking portion 1311 of the positioning block 13 is located beyond the second body 12, the convex 13 is received in the mounting space 1201 and exposed outside, and the tab 132 is received in the mounting groove 1205. wherein the first retaining lump 1313 latches with the mounting slot 1202, the second retaining lump 1322 latches with the second mounting slot 1206, and the posts 1213 are assembled in the receiving holes 1115. The optic fibers 5 extending outside from the mounting holes 1321 are retained in the passageway slot 1204. The locking member 1211 is received in the depression 1113. The locking protrusion 1114 is received in the through hole 1212. The optic fibers 5 and the cable 3 is received in the passageway slot 1204 and extends backwardly outside of the insulative housing 1. The positioning block 13 is damped between the first body 11 and the second body 12.

The cable 3 is received in the mounting space 1201 of the second body 12. Then, the positioning block 13 is assembled downwardly in the first body 11. The cable 3 is retained by both of the receiving passageway 1301 and the inserting slot 1110 and is positioned accurately.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector comprising:
    an insulative housing having a first body and a positioning block, the first body comprising a bottom wall, a front wall extending upwardly from a front of the bottom wall, two extending walls extending upwardly from two sides of the bottom wall and a plurality of inserting slots passing through the front wall and the bottom wall, the positioning block comprising a horizontal portion and a plurality of receiving passageways defined on a bottom of the horizontal portion;
    a plurality of contacts retained in the inserting slot of the first body; and
    a cable arranged in the receiving passageways and fixed to the positioning block;
    each contact has a sharp top end in a top of the contact, the sharp top ends pierce the cable to electrical connect with the cable when the positioning block is assembled downwardly in the first body; wherein
    the positioning block having a convex extending upwardly from a front the horizontal portion, a tab extending backwardly from the convex and an extending portion extending downwardly from the front of the horizontal portion, the convex extends upwardly beyond the tab.

2. The cable connector as claimed in claim 1, wherein the receiving passageways of the positioning block are aligned with the inserting slots, the cable is assembled upwardly into the receiving passageways, the cable is cooperatively retained by the receiving passageways and inserting slots.

3. The cable connector as claimed in claim 1, wherein the front wall of the first body has a retaining groove and a flange extending forwardly from the retaining groove, the extending portion of the position block has a retaining slot, the extending portion is received in the retaining groove and the flange is received in the retaining slot.

4. The cable connector as claimed in claim 1, wherein the insulative housing has a second body which is assembled downwardly into the first body, the positioning block is clamped between the first and second bodies.

5. The cable connector as claimed in claim 4, wherein the second body has a top wall and two side walls extending downwardly from two sides of the top wall, the side wall comprises a plurality of the locking members extending downwardly from the two side wall and a through hole passing through the locking member, the extending wall of the first body has a plurality of depressions upwardly passing through the extending wall and a locking protrusion extending outside from the depressions, the locking member is received in the depression and the locking protrusion is received in the through hole.

6. The cable connector as claimed in claim 5, wherein the second body has a mounting space to receive the convex, the top wall have a lump located in the rear of the first mounting slot and a mounting groove located in the front of the lump for receiving the tab, the mounting groove extends forwardly and communicates with the mounting space, the mounting groove extends backwardly to the lump, a middle of the lump defines a passageway slot, the second body is assembled downwardly in the positioning block, and the convex is received in the mounting space and exposed outside.

7. The cable connector as claimed in claim 6, wherein the positioning block has a first retaining lump extending outside from two sides of the convex, the second body has a first mounting slot extending from two sides of the mounting space and communicating with the mounting space, the first retaining lump is received in the first retaining slot.

8. The cable connector as claimed in claim 6, wherein the positioning block has a second retaining lump extending outside from two sides of the tab, the second body has a second retaining mounting slot, and the second retaining lump is received in the second retaining slot.

9. The cable connector as claimed in claim 1, further comprising two optic lens retained in the two positioning block and two optic fibers retained in the positioning block and extending outside of the insulative housing, and the optic fibers are coupled with the optic lens.

10. The cable connector as claimed in claim 9, wherein the convex has a receiving groove passing therethrough, the tab has a mounting hole passing therethrough and connecting with the receiving groove, the optic fibers are retained in the receiving groove and exposed outside of the receiving groove, the optic lens insert into the receiving groove and couple with the optic lens.

11. A cable connector comprising:
    an insulative housing having a first body, a second body assembled downwardly to the first body and a positioning block clamped by the first and second bodies, the first body comprising a bottom wall, a front wall extending upwardly from a front of the bottom wall, two extending walls extending upwardly from two sides of the bottom wall and a plurality of inserting slots passing through the front wall and the bottom wall, the positioning block comprising a horizontal portion and a plurality of receiving passageways defined on a bottom of the horizontal portion;

a cable retained in the receiving passageways, and a plurality of contacts retained in the inserting slots of the first body, and each contact having a sharp top end in a top thereof, the sharp top ends piercing the cable to electrical connect with the cable when the positioning block is assembled downwardly in the first body.

12. The cable connector as claimed in claim 11, wherein the receiving passageways are aligned with the inserting slots, the cable is assembled upwardly in the receiving passageways, the cable is cooperatively retained by the receiving passageways and inserting slots.

13. The cable connector as claimed in claim 11, wherein the positioning has a convex extending upwardly from a front of the horizontal portion, a tab extending backwardly from the convex and an extending portion extending downwardly from the front of the horizontal portion, the convex extends upwardly beyond the tab.

14. The cable connector as claimed in claim 11, wherein the front wall of the first body has a retaining groove and a flange extending forwardly from the retaining groove, the extending portion of the position block has a retaining slot, the extending portion is received in the retaining groove and the flange is received in the retaining slot.

15. A cable connector assembly comprising:

an insulative housing having at least a first body defining opposite outer and inner surfaces thereon in a vertical direction;

a plurality of contacts disposed in the first body, each of said contacts defining a contacting section around the outer surface for contacting a modular jack and a connecting section around the inner surface;

a plurality of wires regulated by a positioning block having unitarily a deflectable latch thereon; wherein said positioning block is discrete from but assembled to the housing under condition that the connecting sections of the contacts pierce into the corresponding wires for mechanical and electrical connection therebetween, respectively.

16. The cable connector assembly as claimed in claim 15, wherein the positioning block is assembled toward the first body in said vertical direction.

17. The cable connector assembly as claimed in claim 16, wherein said housing further includes a second body secured to the first body for cooperation with the first body to sandwich the positioning block therebetween during assembling the positioning block to the housing.

18. The cable connector assembly as claimed in claim 15, wherein said positioning block defines a plurality of grooves to receive the corresponding wires, respectively.

19. The cable connector assembly as claimed in claim 15, wherein said positioning block defines a pair of through holes in which a pair of optical fibers are received to communicate with an exterior in a front-to-back direction perpendicular to the vertical direction.

\* \* \* \* \*